Patented Jan. 31, 1928.

1,657,724

UNITED STATES PATENT OFFICE.

KENNETH HERBERT SAUNDERS AND HAROLD GOODWIN, OF MANCHESTER, ENGLAND, ASSIGNORS TO BRITISH DYESTUFFS CORPORATION LIMITED.

MONOAZO DYES.

No Drawing. Application filed April 14, 1927, Serial No. 183,895, and in Great Britain April 17, 1926.

This invention relates to the manufacture of monoazo dyes and is an improvement in or modification of the invention claimed in British Patent No. 242,061.

In this Patent No. 242,061, we have described the manufacture of new azo dyestuffs suitable for printing on cotton with mordants, particularly chrome mordants. The first component employed is the sparingly soluble diazo compound obtained from a 1-amino-2-hydroxy-3-carboxynaphthalene-6-sulphonic acid which is prepared by reducing benzene-azo-2:3-hydroxynaphthoic acid and sulphonating the 1-amino-2:3-hydroxynaphthoic acid so obtained. The second components are pyrazolones which couple smoothly and in good yield. Now, as a result of further researches, we have found that the above-mentioned diazo compound will combine with those mono- and dihydroxy-naphthalene sulphonic acids, containing at least one free coupling position, which can be coupled with diazo compounds, and in particular with those derived from α-naphthol, such as chromotropic acid (1:8 dihydroxynaphthalene-3:6-disulphonic acid) and dihydroxy S acid (1:8-dihydroxynaphthalene-4-sulphonic acid).

The dyestuffs so obtained are black or dark powders yielding red to violet solutions in water, exhibiting a blue-red dichroism. The aqueous solution gives a blue spot on filter paper, becoming redder on addition of hydrochloric acid. In concentrated sulphuric acid, the dye dissolves to a bright blue solution becoming red on dilution. The new dyestuffs combine readily with metallic mordants. The shades obtained when printed on cotton range from reddish-blue to bright greenish-blue. The new dyestuffs may also be used as mordant colours for wool.

The following examples will serve to illustrate further the nature of the invention, but we do not confine ourselves to them; the parts are by weight.

Example 1.

283 parts of 1-amino-2-hydroxy-3-carboxy-naphthalene-6-sulphonic acid, which is usually isolated in the form of its hydrochloride, is made into a stiff paste with water and a small amount of crystalline copper sulphate is added. When the copper sulphate has dissolved there is added suddenly a concentrated solution of 70 parts of sodium nitrite and the mixture is stirred cold until diazotization is complete. The mixture is then run into hydrochloric acid and the yellow diazo compound which separates is filtered off. The diazo compound is then made into a paste with water and added to a neutral solution of 304 parts of α-naphthol-4:8-disulphonic acid. To this is then added a milk of lime containing 120 parts of calcium hydroxide and the whole is stirred at about 30° C. until the coupling is complete. The dyestuff is precipitated by addition of excess of hydrochloric acid, common salt being added if necessary to complete the separation. The dyestuff is filtered off, washed with salt solution and dried. It gives a reddish-blue shade fast to light and chlorine, when printed on cotton with a chromium mordant. The dyestuff has the probable formula

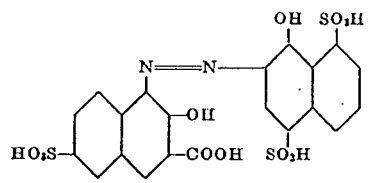

Example 2.

Instead of the α-naphthol-4:8-disulphonic acid named in the above example, other naphthol-sulphonic acids may be used. For example, 1:8-dihydroxynaphthalene-3:6-disulphonic acid gives a greenish-blue dyestuff having the probable formula

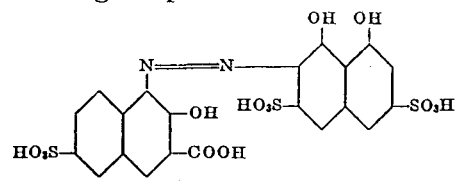

On the other hand 1:8-dihydroxynaphthalene-4-sulphonic acid gives a dyestuff dyeing blue shades and having the probable formula

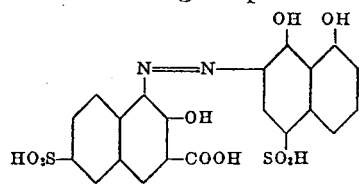

What we claim and desire to secure by Letters Patent is:—

1. The manufacture of azo dyes by diazotizing 1-amino-2-hydroxy-3-carboxynaphthalene-6-sulphonic acid and coupling the diazo compound with sulphonated hydroxynaphthalene.

2. The manufacture of azo dyes by diazotizing 1-amino-2-hydroxy-3-carboxynaphthalene-6-sulphonic acid and coupling the diazo compound with sulphonated dihydroxynaphthalene.

3. The manufacture of azo dyes by diazotizing 1-amino-2-hydroxy-3-carboxynaphthalene-6-sulphonic acid and coupling the diazo compound with dihydroxynaphthalene sulphonated in the 3.6 position.

4. The manufacture of azo dyes by diazotizing 1-amino-2-hydroxy-6-sulpho-3 naphthoic acid and coupling the diazo compound with 1:8-dihydroxynaphthalene-3:6-disulphonic acid.

5. As a new material, a dyestuff having the probable formula

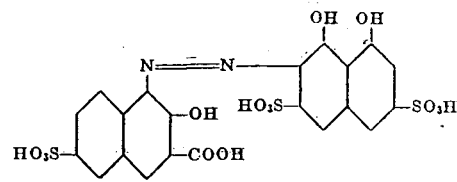

said dyestuff being a black powder, soluble in water to a voilet solution showing a blue-red dichroism, the aqueous solution giving on filter paper a blue spot which becomes redder on addition of hydrochloric acid, and said dyestuff giving in concentrated sulphuric acid a bright blue solution becoming red on dilution with water.

In testimony whereof we affix our signatures.

KENNETH HERBERT SAUNDERS.
HAROLD GOODWIN.